US008894829B2

(12) United States Patent
Haryu et al.

(10) Patent No.: US 8,894,829 B2
(45) Date of Patent: Nov. 25, 2014

(54) WATER ELECTROLYSIS APPARATUS

(75) Inventors: Eiji Haryu, Utsunomiya (JP); Masanori Okabe, Nerima-ku (JP); Koji Nakazawa, Utsunomiya (JP); Kenji Taruya, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 1009 days.

(21) Appl. No.: 12/974,804

(22) Filed: Dec. 21, 2010

(65) Prior Publication Data
US 2011/0147202 A1   Jun. 23, 2011

(30) Foreign Application Priority Data

Dec. 21, 2009 (JP) ................................. 2009-288948
Dec. 21, 2009 (JP) ................................. 2009-289238

(51) Int. Cl.
| C25B 9/18 | (2006.01) |
| C25B 1/10 | (2006.01) |
| C25B 15/08 | (2006.01) |
| C25B 9/20 | (2006.01) |
| C25B 1/04 | (2006.01) |

(52) U.S. Cl.
CPC ................. *C25B 1/04* (2013.01); *Y02E 60/366* (2013.01); *C25B 15/08* (2013.01); *C25B 9/20* (2013.01)
USPC ........... 204/257; 204/253; 204/258; 204/263; 204/270; 204/278

(58) Field of Classification Search
USPC ................................................. 204/253, 257
See application file for complete search history.

(56) References Cited

U.S. PATENT DOCUMENTS

| 4,210,511 | A | * | 7/1980 | Campbell et al. ............. 204/256 |
| 6,117,287 | A | * | 9/2000 | Molter et al. ................. 204/255 |
| 6,855,450 | B2 | * | 2/2005 | Molter et al. ................. 429/458 |
| 7,824,527 | B2 | * | 11/2010 | Vandenborre ................. 204/279 |
| 2005/0115825 | A1 | * | 6/2005 | Frank et al. .................... 204/253 |
| 2006/0237306 | A1 | * | 10/2006 | Nakazawa et al. ............ 204/258 |
| 2010/0187102 | A1 | * | 7/2010 | Schmitt et al. ................ 204/263 |

FOREIGN PATENT DOCUMENTS

| JP | 8-239786 | 9/1996 |
| JP | 9-95791 | 4/1997 |
| JP | 2001-11680 | 1/2001 |
| JP | 2005-56671 | 3/2005 |
| JP | 2008-223098 | 9/2008 |

OTHER PUBLICATIONS

Japanese Office Action for Application No. 2009-288948, dated Dec. 6, 2011.

* cited by examiner

*Primary Examiner* — Bryan D. Ripa
(74) *Attorney, Agent, or Firm* — Nelson Mullins Riley & Scarborough LLP; Anthony A. Laurentano (57) ABSTRACT

A water electrolysis apparatus is formed by stacking a plurality of unit cells. Each unit cell includes a membrane electrode assembly, and an anode separator and a cathode separator which sandwich the membrane electrode assembly therebetween. The anode separator has a plurality of inlet joint channels in fluid communication with a water supply passage, and a plurality of outlet joint channels in fluid communication with a discharge passage. The water supply passage has an inner wall surface at which the inlet joint channels are open, and an outer wall surface which faces the inner wall surface, the inner wall surface and the outer wall surface jointly forming an opening of an oblong cross-sectional shape.

12 Claims, 11 Drawing Sheets

WATER ELECTROLYSIS APPARATUS

CROSS-REFERENCE TO RELATED APPLICATION

This application is based upon and claims the benefit of priority from Japanese Patent Applications No. 2009-288948 filed on Dec. 21, 2009 and No. 2009-289238 filed on Dec. 21, 2009, of which the contents are incorporated herein by reference.

BACKGROUND OF THE INVENTION

1. Field of the Invention

The present invention relates to a water electrolysis apparatus formed by stacking a plurality of unit cells, the unit cells each including an electrolyte membrane, circular current collectors disposed on the respective opposite sides of the electrolyte membrane, and separators stacked on the current collectors, wherein a water flow field for supplying water is defined between one of the current collectors and one of the separators and a hydrogen flow field for producing hydrogen by electrolyzing the water is defined between the other of the current collectors and the other of the separators.

2. Description of the Related Art

Solid polymer electrolyte fuel cells generate DC electric energy when anodes thereof are supplied with a fuel gas, i.e., a gas mainly composed of hydrogen, e.g., a hydrogen gas, and cathodes thereof are supplied with an oxygen-containing gas, a gas mainly composed of oxygen, e.g., air.

Generally, water electrolysis apparatus are used to generate a hydrogen gas for use as a fuel gas for such solid polymer electrolyte fuel cells. The water electrolysis apparatus employ a solid polymer electrolyte membrane for decomposing water to generate hydrogen (and oxygen). Electrode catalyst layers are disposed on the respective sides of the solid polymer electrolyte membrane, making up a membrane electrode assembly. Current collectors are disposed on the respective opposite sides of the membrane electrode assembly, making up a unit. The unit is essentially similar in structure to the fuel cells described above.

A plurality of such units are stacked, and a voltage is applied across the stack while water is supplied to the current collectors on the anode side. On the anodes of the membrane electrode assemblies, the water is decomposed to produce hydrogen ions (protons). The hydrogen ions move through the solid polymer electrolyte membranes to the cathodes, where the hydrogen ions combine with electrons to generate hydrogen. On the anodes, oxygen generated together with hydrogen is discharged with excess water from the units.

Figure 11:
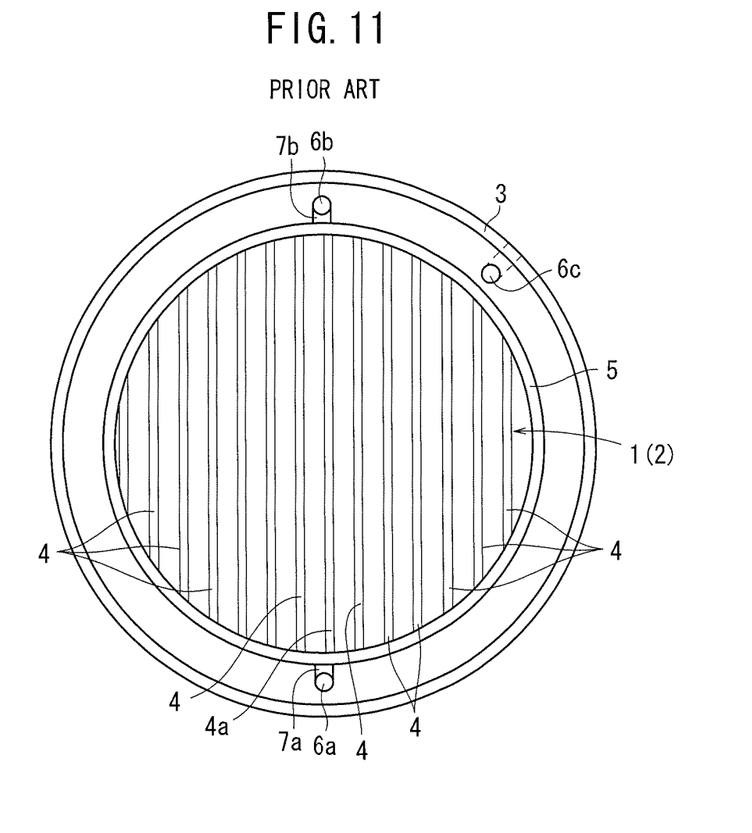
FIG. 11 is a plan view of a water electrolysis apparatus disclosed in Japanese Laid-Open Patent Publication No. 09-095791.

Japanese Laid-Open Patent Publication No. 09-095791 discloses a water electrolysis apparatus of the type described above. As shown in FIG. 11 of the accompanying drawings, the disclosed water electrolysis apparatus includes a cell 2 comprising a solid polymer electrolyte membrane sandwiched between a disk-shaped anode feeder plate 1 and a disk-shaped cathode feeder plate. A plurality of such cells 2 are stacked with separator plates interposed therebetween. The anode feeder plate 1 is fitted in a casing ring 3 forming a casing.

The anode feeder plate 1 has a plurality of parallel grooves 4 defined in a surface thereof that is not held in contact with the solid polymer electrolyte membrane. Each of the grooves 4 serves as a flow field for pure water and also as a flow field for a generated oxygen-containing gas to flow therethrough. The casing ring 3 has a circumferential groove 5 defined in an inner circumferential surface thereof and held in fluid communication with the grooves 4. The casing ring 3 also has three through holes 6a, 6b, 6c defined therein which extend along the direction in which the cells 2 are stacked.

The through hole 6a, which serves to supply pure water, and the circumferential groove 5 are connected to each other by a passage 7a defined in the casing ring 3 therebetween. The through hole 6b, which serves to discharge pure water and an oxygen gas, and the circumferential groove 5 are connected to each other by a passage 7b defined in the casing ring 3 therebetween. The through hole 6c, which serves to discharge a hydrogen gas, is disposed closely to the through hole 6b. Hydrogen which is generated at the cathode feeder plate by electrolysis of water is introduced into the through hole 6c.

In the above water electrolysis apparatus, pure water flows from the through hole 6a through the passage 7a to the circumferential groove 5, and is then distributed into the grooves 4. At that time, the pure water tends to be distributed preferentially into the central groove 4a which is positioned near the passage 7a. Therefore, the ability to distribute pure water equally into the grooves 4 tends to be lowered, and the distributed pure water flows at widely different rates through the grooves 4, so that the water electrolyzing process is not performed efficiently.

Also, in the above water electrolysis apparatus, oxygen (reactant gas) generated by a reaction, in addition to unreacted water, flows downstream of the grooves 4. Accordingly, a two-phase flow of water and oxygen exists in the passage 7b, and the generated gas results in an abrupt increase of the volume.

Thus, the pressure loss in the passage 7b is larger than that in the passage 7a in which only water exists. Therefore, since an overall pressure loss in the water electrolysis apparatus is large, a high-power and high-performance water pump is required, which is not economical.

SUMMARY OF THE INVENTION

It is an object of the present invention to provide a water electrolysis apparatus which is capable of distributing water equally into a water flow field and supplying water uniformly and reliably to the water flow field for an efficient water electrolyzing process.

It is an object of the present invention to provide a water electrolysis apparatus which is capable of suitably reducing the pressure loss in the water flow field and flowing water efficiently and economically, with a simple structure.

According to the present invention, there is provided a water electrolysis apparatus formed by stacking a plurality of unit cells, the unit cells each comprising an electrolyte membrane, a pair of current collectors disposed respectively on opposite sides of the electrolyte membrane, a pair of separators stacked respectively on the current collectors, wherein a water flow field for supplying water is defined between one of the current collectors and one of the separators and a hydrogen flow field for producing hydrogen through electrolysis of the water is defined between the other current collector and the other separator.

In the water electrolysis apparatus, the unit cell further comprises a water supply passage extending along a stacked direction in which the unit cells are stacked, for supplying the water to the water flow field, a discharge passage extending along the stacked direction, for discharging a remaining amount of the water from the water flow field, and a plurality of inlet joint channels interconnecting the water supply passage and the water flow field. Further, the water supply passage has an inner wall surface at which the inlet joint channels are open, and an outer wall surface which faces the inner wall surface, the inner wall surface and the outer wall surface jointly forming an opening of an oblong cross-sectional shape.

In the water electrolysis apparatus, the unit cell further comprises a water supply passage extending along a stacked direction in which the unit cells are stacked, for supplying the water to the water flow field, a discharge passage extending along the stacked direction, for discharging generated oxygen and a remaining amount of the water from the water flow field, an inlet joint channel interconnecting the water supply passage and the water flow field, and an outlet joint channel interconnecting the discharge passage and the water flow field. Further, the cross sectional area of the outlet joint channel is greater than the cross sectional area of the inlet joint channel.

According to the present invention, there are provided the inlet joint channels for interconnecting the water supply passage and the water flow field, and the water supply passage has an inner wall surface at which the inlet joint channels are open, and an outer wall surface which faces the inner wall surface, the inner wall surface and the outer wall surface jointly forming an opening of an oblong cross-sectional shape.

Accordingly, water flowing through the oblong water supply passage is distributed equally into the inlet joint channels and then supplied to the water flow field. Thus, water is prevented from flowing preferentially into the central area of the water flow field, which is positioned near the water supply passage.

Accordingly, variation in pressure loss in the water flow field is prevented efficiently, whereby water can be distributed equally over the whole area of the water flow field. Consequently, the entire water flow field can be uniformly and reliably supplied with water for an efficient water electrolyzing process.

Also, according to the present invention, the cross sectional area of the outlet joint channel interconnecting the discharge passage and the water flow field is greater than the cross sectional area of the inlet joint channel interconnecting the water supply passage and the water flow field.

Thus, even if unreacted water and generated oxygen exist in the outlet joint channels and the volume increases accordingly, increase in the pressure loss in the outlet joint channels can be prevented. Therefore, with a simple arrangement, the pressure loss in the water flow field can be reduced suitably, whereby water can flow therethrough efficiently and economically. Consequently, the entire water flow field can be uniformly and reliably supplied with water for an efficient water electrolyzing process.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
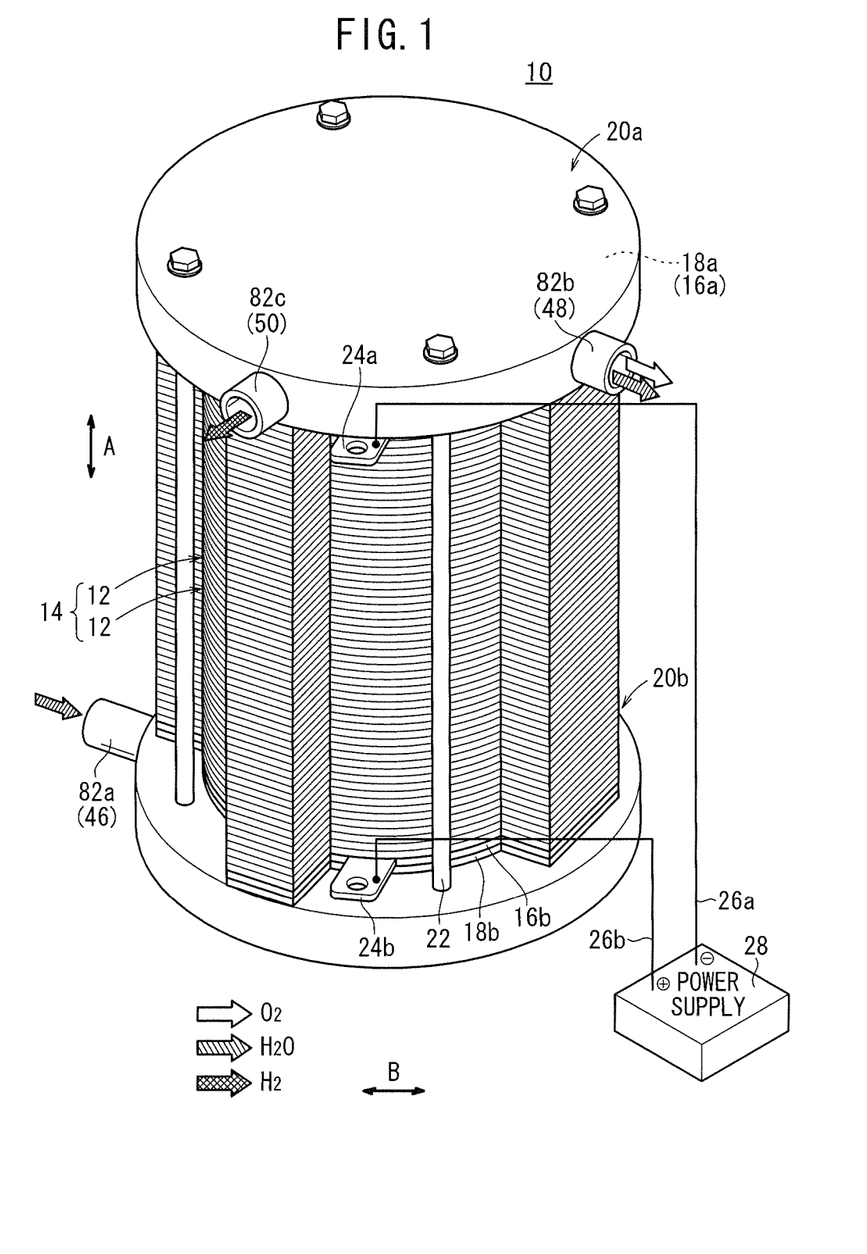
FIG. 1 is a perspective view of a water electrolysis apparatus according to a first embodiment of the present invention.
Figure 2:
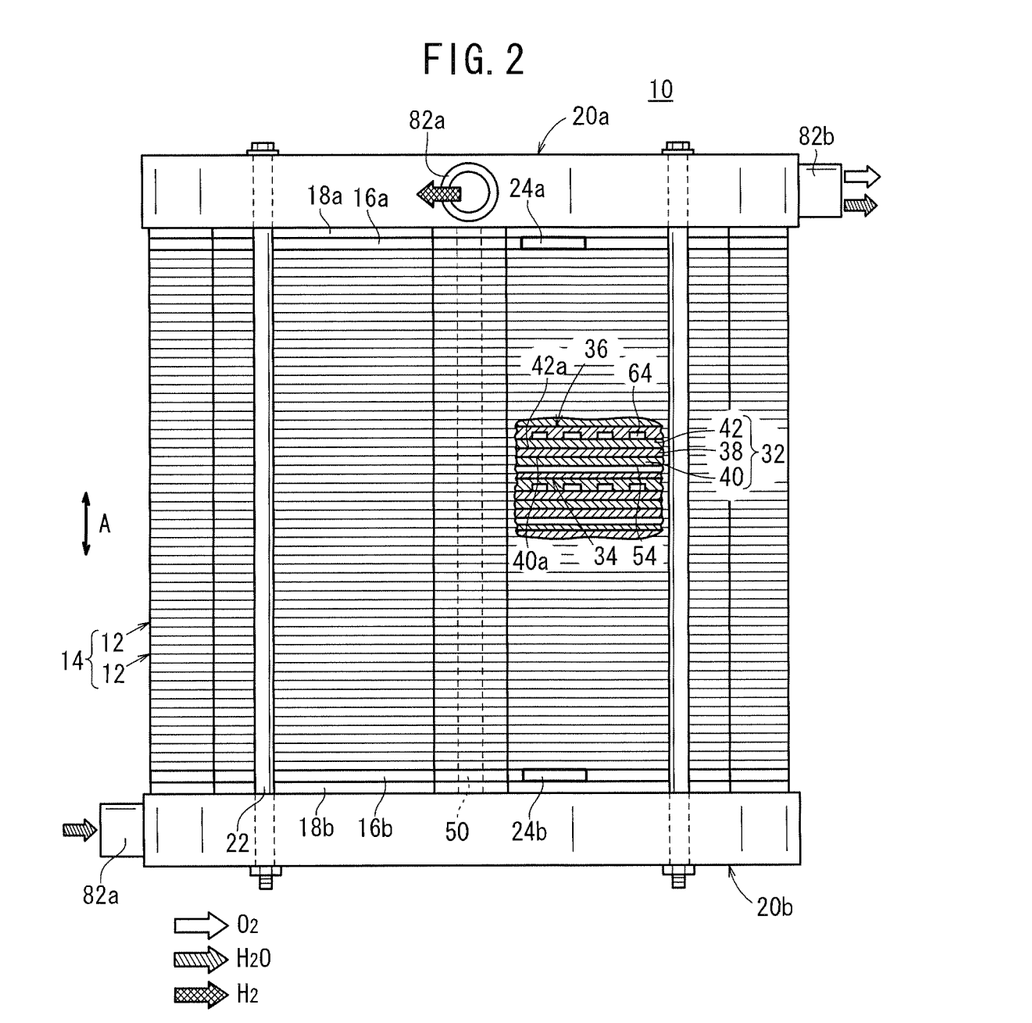
FIG. 2 is a side elevational view, partly in cross section, of the water electrolysis apparatus shown in FIG. 1.

As shown in FIGS. 1 and 2, a water electrolysis apparatus 10 according to a first embodiment of the present invention serves as a high-pressure hydrogen manufacturing apparatus, and includes a stack assembly 14 comprising a plurality of unit cells 12 stacked in a vertical direction indicated by the arrow A.

The water electrolysis apparatus 10 also includes a terminal plate 16a, an insulating plate 18a, and an end plate 20a which are mounted on an upper end of the stack assembly 14 upwardly in the order named, and a terminal plate 16b, an insulating plate 18b, and an end plate 20b which are mounted on a lower end of the stack assembly 14 downwardly in the order named. The unit cells 12, the terminal plates 16a, 16b, the insulating plates 18a, 18b, and the end plates 20a, 20b are of a disk shape.

The stack assembly 14, the terminal plates 16a, 16b, and the insulating plates 18a, 18b are fastened integrally together by the end plates 20a, 20b that are interconnected by four tie rods 22 extending in the directions indicated by the arrow A between the end plates 20a, 20b. The four tie rods 22 are angularly equally spaced around the centers of the end plates 20a, 20b.

Alternatively, the stack assembly 14, the terminal plates 16a, 16b, and the insulating plates 18a, 18b may be integrally held together in a box-like casing, not shown, which includes the end plates 20a, 20b as end walls. The water electrolysis apparatus 10 is illustrated as being of a substantially cylindrical shape.

Terminals 24a, 24b project radially outwardly from respective side edges of the terminal plates 16a, 16b. As shown in FIG. 1, the terminals 24a, 24b are electrically connected to a power supply 28 by electric wires 26a, 26b, respectively. The terminal 24a, which is a cathode terminal, is connected to the negative terminal of the power supply 28, and the terminal 24b, which is an anode terminal, is connected to the positive terminal of the power supply 28.

Figure 3:
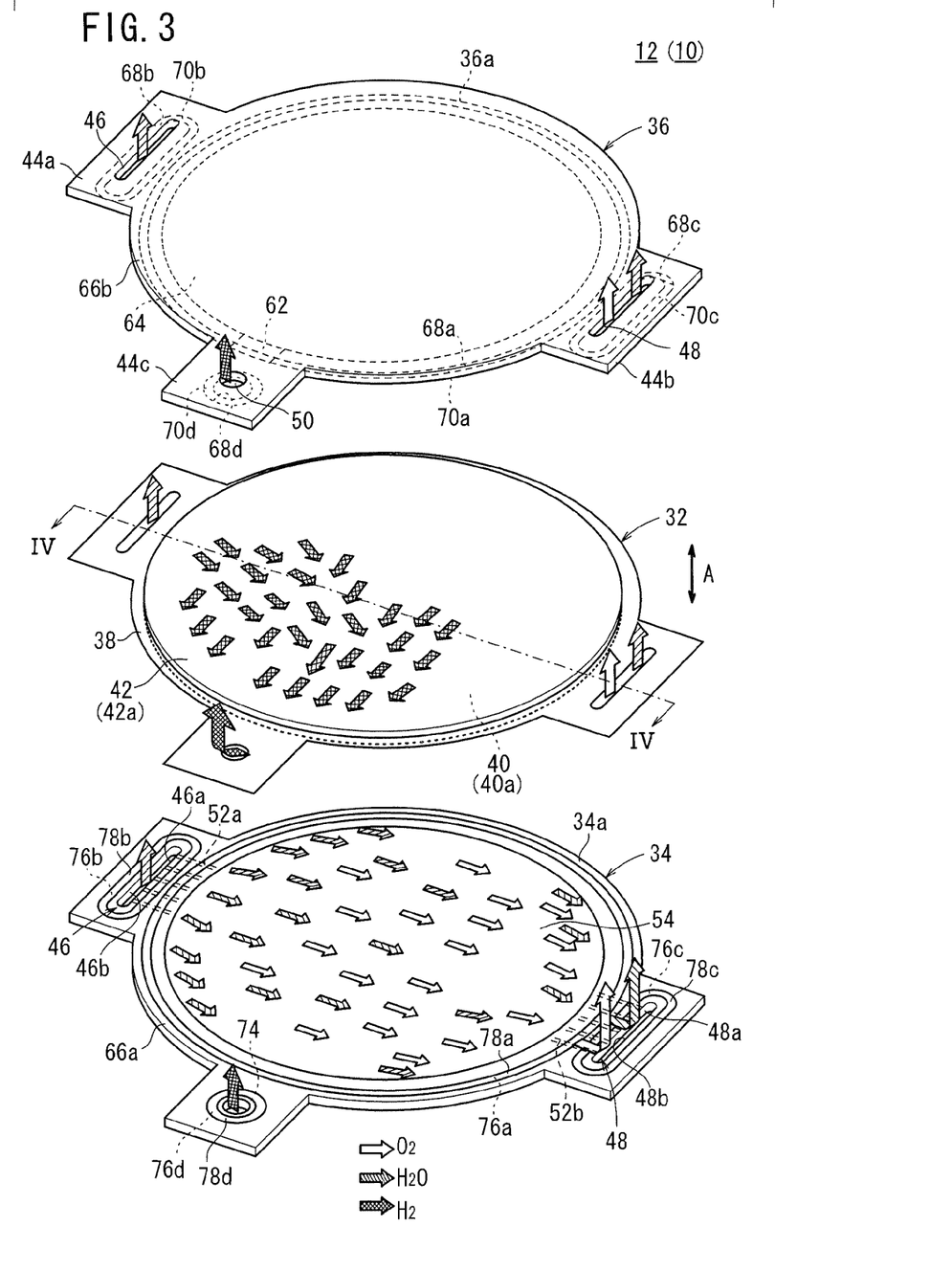
FIG. 3 is an exploded perspective view of a unit cell of the water electrolysis apparatus.

As shown in FIGS. 2 and 3, each of the unit cells 12 comprises a substantially disk-shaped membrane electrode assembly 32, and an anode separator 34 and a cathode separator 36 which sandwich the membrane electrode assembly 32 therebetween. Each of the anode separator 34 and the cathode separator 36 is of a substantial disk shape and is in the form of a carbon plate, or in the form of a metal plate such as a steel plate, a stainless steel plate, a titanium plate, an aluminum plate, or a plated steel plate. Alternatively, each of the separators 34, 36 is formed by performing anti-corrosion treatment on the surface of such a metal plate and thereafter pressing the metal plate into shape, or by cutting the metal plate into shape and thereafter performing anti-corrosion treatment on the surface of the cut metal plate.

The membrane electrode assembly 32 has a solid polymer electrolyte membrane 38 comprising a thin membrane of perfluorosulfonic acid which is impregnated with water, and a circular anode current collector 40 and a circular cathode current collector 42 which are disposed respectively on the opposite surfaces of the solid polymer electrolyte membrane 38. The solid polymer electrolyte membrane 38 has a peripheral edge projecting radially outwardly from the outer circumferential edges of the anode current collector 40 and the cathode current collector 42.

An anode catalyst layer 40a and a cathode catalyst layer 42a are formed on the opposite surfaces of the solid polymer electrolyte membrane 38, respectively. The anode catalyst layer 40a is made of a Ru (ruthenium)-based catalyst, for example, and the cathode catalyst layer 42a is made of a platinum catalyst, for example.

Each of the anode current collector 40 and the cathode current collector 42 is made of a sintered spherical atomized titanium powder (porous electrically conductive material), and has a smooth surface area which is etched after it is cut to shape. Each of the anode current collector 40 and the cathode current collector 42 has a porosity in the range of 10% through 50%, or more preferably in the range from 20% through 40%.

As shown in FIG. 3, each unit cell 12 has a first projection 44a, a second projection 44b, and a third projection 44c which project radially outwardly from its outer circumferential edge in the plane of the separators. The first projection 44a has a water supply passage 46 defined therein. The water supply passages 46 of the unit cells 12 are held in fluid communication with each other along the stacked direction indicated by the arrow A, and serve to supply water (pure water).

The second projection 44b has a discharge passage 48 defined therein. The discharge passages 48 of the unit cells 12 are held in fluid communication with each other along the stacked direction indicated by the arrow A, and serve to discharge oxygen generated by an electrochemical reaction and water that has been used. The third projection 44c has a hydrogen passage 50 defined therein. The hydrogen passages 50 of the unit cells 12 are held in fluid communication with each other along the stacked direction indicated by the arrow A, and serve to pass hydrogen generated as a second fluid by an electrochemical reaction therethrough. The water supply passage 46 and the discharge passage 48 each have an opening of an oblong cross-sectional shape and are positioned symmetrically with respect to the center of the unit cell 12, i.e., diametrically across the unit cell 12.

Figure 4:
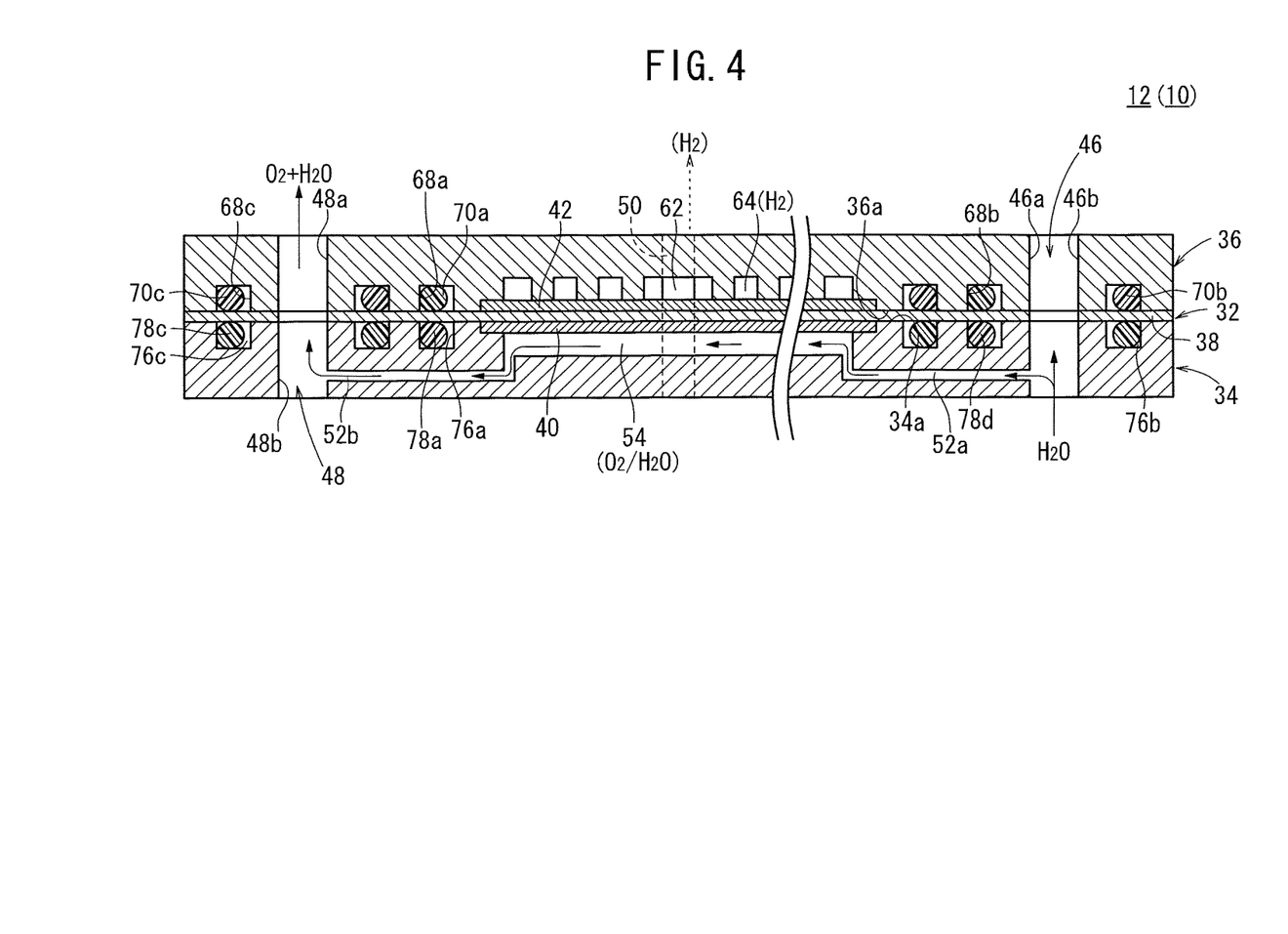
FIG. 4 is a fragmentary cross-sectional view of the unit cell, taken along line IV-IV of FIG. 3.
Figure 5:
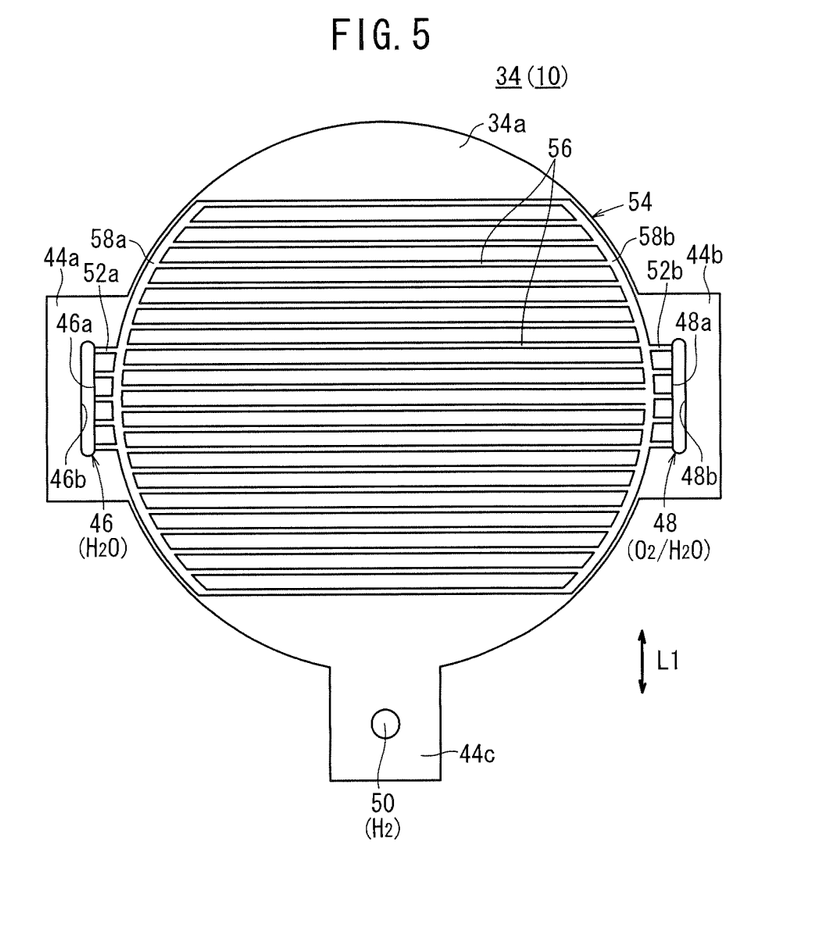
FIG. 5 is a plan view of an anode separator of the unit cell.

As shown in FIGS. 3 through 5, the anode separator 34 has a plurality of (e.g., five) inlet joint channels 52a held in fluid communication with the water supply passage 46 and a plurality of (e.g., five) outlet joint channels 52b held in fluid communication with the discharge passage 48. The inlet joint channels 52a and the outlet joint channels 52b each have an opening of a circular cross-sectional shape, and are arranged in parallel to each other (see FIG. 5).

The water supply passage 46 has an inner wall surface 46a at which the inlet joint channels 52a are open, and an outer wall surface 46b which faces the inner wall surface 46a, the inner wall surface 46a and the outer wall surface 46b jointly forming an opening of an oblong cross-sectional shape. The discharge passage 48 has an inner wall surface 48a at which the outlet joint channels 52b are open, and an outer wall surface 48b which faces the inner wall surface 48a, the inner wall surface 48a and the outer wall surface 48b jointly forming an opening of an oblong cross-sectional shape.

The anode separator 34 also has a water flow field 54 defined in a surface 34a thereof which faces the membrane electrode assembly 32 and held in fluid communication with the inlet joint channels 52a and the outlet joint channels 52b.

As shown in FIG. 5, the water flow field 54 comprises a plurality of water channels 56 extending along the plane of the current collector in parallel to an imaginary straight line (diameter) which interconnects the water supply passage 46 and the discharge passage 48, and the water channels 56 being disposed parallel to each other within the plane of the anode current collector 40, an arcuate inlet buffer 58a extending around the anode current collector 40 and held in fluid communication with the water supply passage 46, and an arcuate outlet buffer 58b extending around the anode current collector 40 and held in fluid communication with the discharge passage 48.

Each of the inlet joint channels 52a has one end connected to the arcuate inlet buffer 58a, and each of the outlet joint channels 52b has one end connected to the arcuate outlet buffer 58b.

As shown in FIGS. 3 and 4, the cathode separator 36 has a discharge channel 62 defined in an outer circumferential edge portion thereof in fluid communication with the hydrogen passage 50. The cathode separator 36 also has a hydrogen flow field 64 defined in a surface 36a thereof that faces the membrane electrode assembly 32 and held in fluid communication with the discharge channel 62. The hydrogen flow field 64 extends within a range corresponding to the surface area of the cathode current collector 42, and comprises a plurality of flow field grooves, a plurality of embossed ridges, or the like (see FIGS. 2 and 4).

Seal members 66a, 66b are integrally combined with respective outer circumferential edge portions of the anode separator 34 and the cathode separator 36. The seal members 66a, 66b are made of a seal material, a cushion material, or a gasket material such as EPDM, NBR, fluororubber, silicone rubber, fluorosilicone rubber, butyl rubber, natural rubber, styrene rubber, chloroprene, acrylic rubber, or the like.

As shown in FIGS. 3 and 4, the surface 36a of the cathode separator 36 which faces the membrane electrode assembly 32 has a first seal groove 68a defined therein which extends annularly around the hydrogen flow field 64.

The surface 36a of the cathode separator 36 also has a second seal groove 68b, a third seal groove 68c, and a fourth seal groove 68d defined therein which extend annularly around the water supply passage 46, the discharge passage 48, and the hydrogen passage 50, respectively. A first seal member 70a, a second seal member 70b, a third seal member 70c, and a fourth seal member 70d, each in the form of an O-ring, for example, are disposed respectively in the first seal groove 68a, the second seal groove 68b, the third seal groove 68c, and the fourth seal groove 68d.

The surface 34a of the anode separator 34 which faces the membrane electrode assembly 32 has a first seal groove 76a defined therein which extends annularly around the water flow field 54 and which is open toward the first seal groove 68a.

The surface 34a of the anode separator 34 also has a second seal groove 76b, a third seal groove 76c, and a fourth seal groove 76d defined therein which extend annularly around the water supply passage 46, the discharge passage 48, and the hydrogen passage 50, respectively, and which are open toward the second seal groove 68b, the third seal groove 68c, and the fourth seal groove 68d, respectively. A first seal member 78a, a second seal member 78b, a third seal member 78c and a fourth seal member 78d, each in the form of an O-ring, for example, are disposed respectively in the first seal groove 76a, the second seal groove 76b, the third seal groove 76c and the fourth seal groove 76d.

As shown in FIGS. 1 and 2, a pipe 82a is connected to the end plate 20b in fluid communication with the water supply passage 46, and pipes 82b, 82c are connected to the end plate 20a in fluid communication with the discharge passage 48 and the hydrogen passage 50, respectively. A back pressure valve or a solenoid-operated valve, not shown, is connected to the pipe 82c for maintaining the pressure of hydrogen generated in the hydrogen passages 50 at a high pressure level.

Operation of the water electrolysis apparatus 10 will be described below.

As shown in FIG. 1, water is supplied vertically upward from the pipe 82a to the water supply passage 46 in the water electrolysis apparatus 10, and a voltage is applied between the terminals 24a, 24b of the terminal plates 16a, 16b by the power supply 28. As shown in FIG. 3, in each of the unit cells 12, the water is supplied from the water supply passage 46 into the water flow field 54 of the anode separator 34 and moves along the anode current collector 40.

The water is electrolyzed by the anode catalyst layer 40a, generating hydrogen ions, electrons, and oxygen. The hydrogen ions generated by the anodic reaction move through the solid polymer electrolyte membrane 38 to the cathode catalyst layer 42a where they combine with the electrons to produce hydrogen.

The produced hydrogen flows along the hydrogen flow field 64 that is defined between the cathode separator 36 and the cathode current collector 42. The hydrogen is kept under a pressure higher than the pressure in the water supply passage 46, and flows vertically upward through the hydrogen passage 50. Thus, the hydrogen is extracted from the water electrolysis apparatus 10. The oxygen generated by the anodic reaction and the water that has been used flow in the water flow field 54 and then flow vertically upward through the discharge passage 48 for being discharged from the water electrolysis apparatus 10.

According to the first embodiment, as shown in FIGS. 3 and 5, there are provided the inlet joint channels 52a for interconnecting the water supply passage 46 and the water flow field 54, and the water supply passage 46 has the inner wall surface 46a at which the inlet joint channels 52a are open, and the outer wall surface 46b which faces the inner wall surface 46a, the inner wall surface 46a and the outer wall surface 46b jointly forming the opening of the oblong cross-sectional shape.

Thus, water flowing through the oblong water supply passage 46 is distributed equally into the inlet joint channels 52a, and supplied to the water flow field 54. Therefore, water is prevented from flowing preferentially into the central area of the water flow field 54, which is positioned near the water supply passage 46.

Accordingly, variation in pressure loss in the water flow field 54 is prevented efficiently, whereby water can be distributed equally over the whole area of the water flow field 54. Consequently, the entire water flow field 54 can be uniformly and reliably supplied with water for an efficient water electrolyzing process.

According to the first embodiment, there are also provided the outlet joint channels 52b for communicating the discharge passage 48 with the water flow field 54, and the discharge passage 48 has the inner wall surface 48a at which the outlet joint channels 52b are open, and the outer wall surface 48b which faces the inner wall surface 48a, the inner wall surface 48a and the outer wall surface 48b jointly forming the opening of the oblong cross-sectional shape.

Thus, the pressure loss caused when water flowing through the outlet joint channels 52b merges into the discharge passage 48, is reduced. Therefore, the entire water flow field 54 can be uniformly and reliably supplied with water for an efficient water electrolyzing process.

Figure 6:
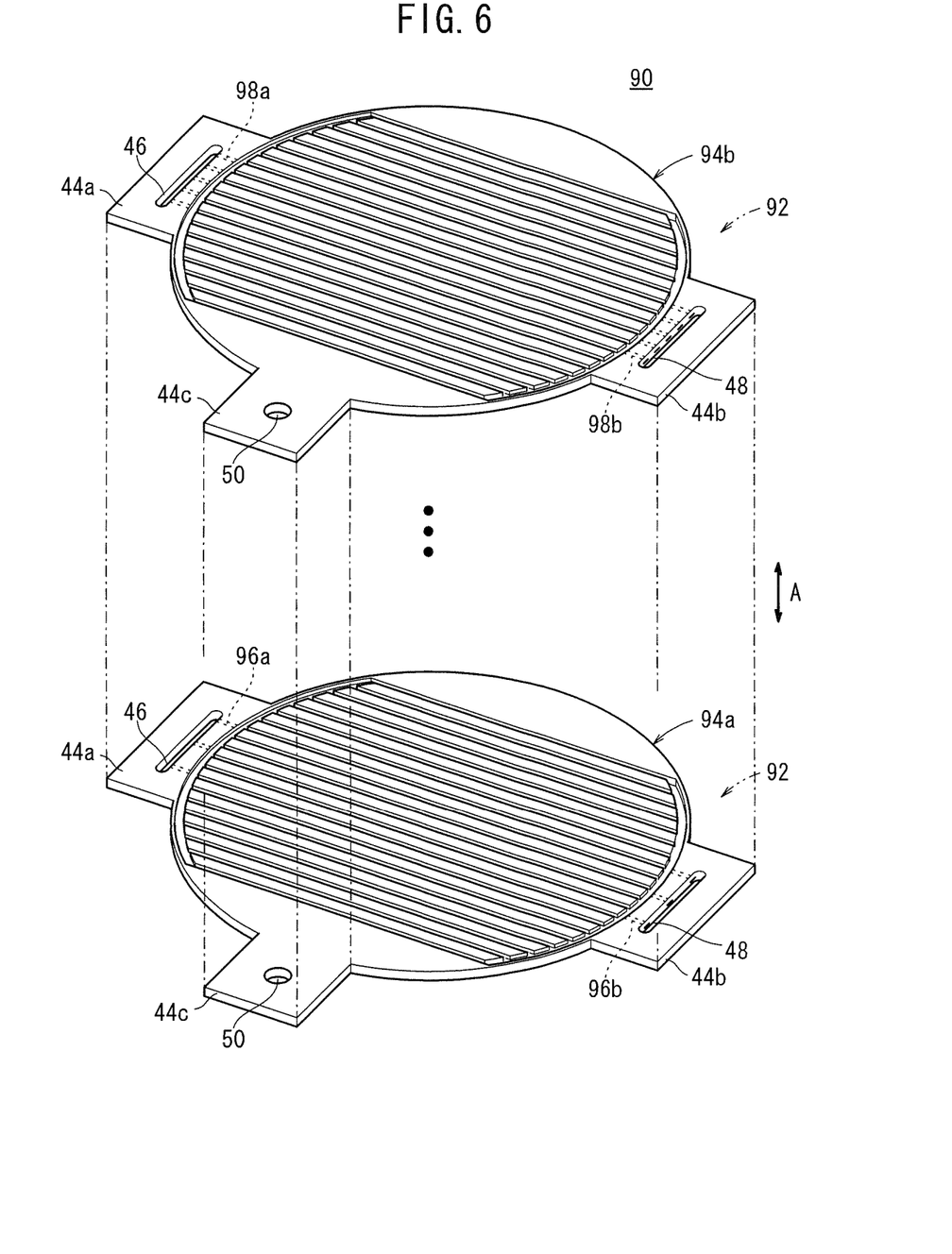
FIG. 6 is a perspective view of a water electrolysis apparatus according to a second embodiment of the present invention.

FIG. 6 is a perspective view of a water electrolysis apparatus 90 according to a second embodiment of the present invention. Those parts of the water electrolysis apparatus 90 which are identical to those of the water electrolysis apparatus 10 according to the first embodiment are denoted by identical reference characters and will not be described below.

The water electrolysis apparatus 90 includes a plurality of unit cells 92 stacked vertically (in the direction indicated by arrow A). The unit cells 92 that are positioned vertically downward each have an anode separator 94a, whereas the unit cells 92 that are positioned vertically upward each have an anode separator 94b.

The anode separator 94a has a plurality of (e.g., three) inlet joint channels 96a held in fluid communication with the water supply passage 46, and a plurality of (e.g., three) outlet joint channels 96b held in fluid communication with the discharge passage 48. On the other hand, the anode separator 94b has a plurality of (e.g., five) inlet joint channels 98a held in fluid communication with the water supply passage 46, and a plurality of (e.g., five) outlet joint channels 98b held in fluid communication with the discharge passage 48.

According to the second embodiment, the number of the inlet joint channels 98a of the unit cell 92 that is positioned vertically upward is greater than the number of the inlet joint channels 96a of the unit cell 92 that is positioned vertically downward.

Accordingly, the pressure loss in the inlet joint channels 98a of the upper unit cell 92 is less than the pressure loss in the inlet joint channels 96a of the lower unit cell 92. Thus, water flowing vertically upward through the water supply passages 46 also can be distributed equally into the water flow fields 54 of the unit cells 92 which are stacked together vertically.

Also, the number of the outlet joint channels 98b of the unit cell 92 that is positioned vertically upward is greater than the number of the outlet joint channels 96b of the unit cell 92 that is positioned vertically downward. Thus, water can be distributed equally into the water flow fields 54 of the unit cells 92 which are stacked together vertically.

The number of the inlet joint channels 96a, 98a may increase stepwise or continuously from bottom to top vertically. Similarly, the number of the outlet joint channels 96b, 98b may increase stepwise or continuously from bottom to top vertically. In this respect, the case of a third embodiment to be described later on is similar to the case of the second embodiment.

Figure 7:
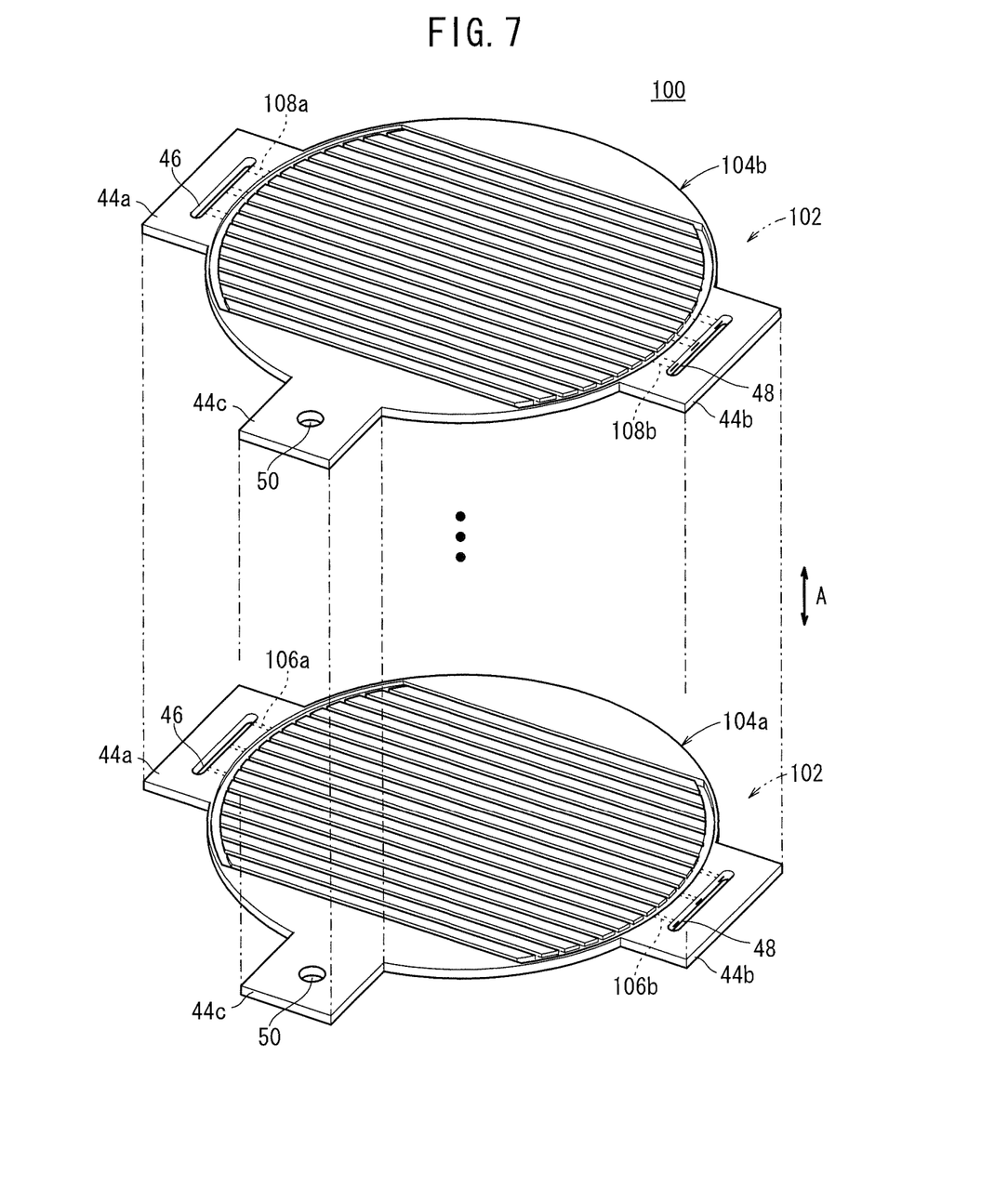
FIG. 7 is a perspective view of a water electrolysis apparatus according to a third embodiment of the present invention.

FIG. 7 is a perspective view of a water electrolysis apparatus 100 according to a third embodiment of the present invention. Those parts of the water electrolysis apparatus 100 which are identical to those of the water electrolysis apparatus 10 according to the first embodiment are denoted by identical reference characters and will not be described below.

The water electrolysis apparatus 100 includes a plurality of unit cells 102 stacked vertically (in the direction indicated by arrow A). The unit cells 102 that are positioned vertically downward each have an anode separator 104a, whereas the unit cells 102 that are positioned vertically upward each have an anode separator 104b.

The anode separator 104a has a plurality of (e.g., three) inlet joint channels 106a held in fluid communication with the water supply passage 46, and a plurality of (e.g., three)

outlet joint channels 106b held in fluid communication with the discharge passage 48. On the other hand, the anode separator 104b has a plurality of (e.g., three) inlet joint channels 108a held in fluid communication with the water supply passage 46, and a plurality of (e.g., three) outlet joint channels 108b held in fluid communication with the discharge passage 48.

The cross sectional area (opening diameter) of the inlet joint channel 108a is greater than that of the inlet joint channel 106a, and the cross sectional area (opening diameter) of the outlet joint channel 108b is greater than that of the outlet joint channel 106b.

According to the third embodiment, the cross sectional area of the inlet joint channel 108a of the unit cell 102 that is positioned vertically upward is greater than that of the inlet joint channel 106a of the unit cell 102 that is positioned vertically downward.

Accordingly, the pressure loss in the inlet joint channels 108a of the upper unit cell 102 is less than the pressure loss in the inlet joint channels 106a of the lower unit cell 102. Thus, as in the second embodiment, water flowing vertically upward through the water supply passages 46 can be distributed equally into the water flow fields 54 of the unit cells 102 which are stacked together vertically.

Figure 8:
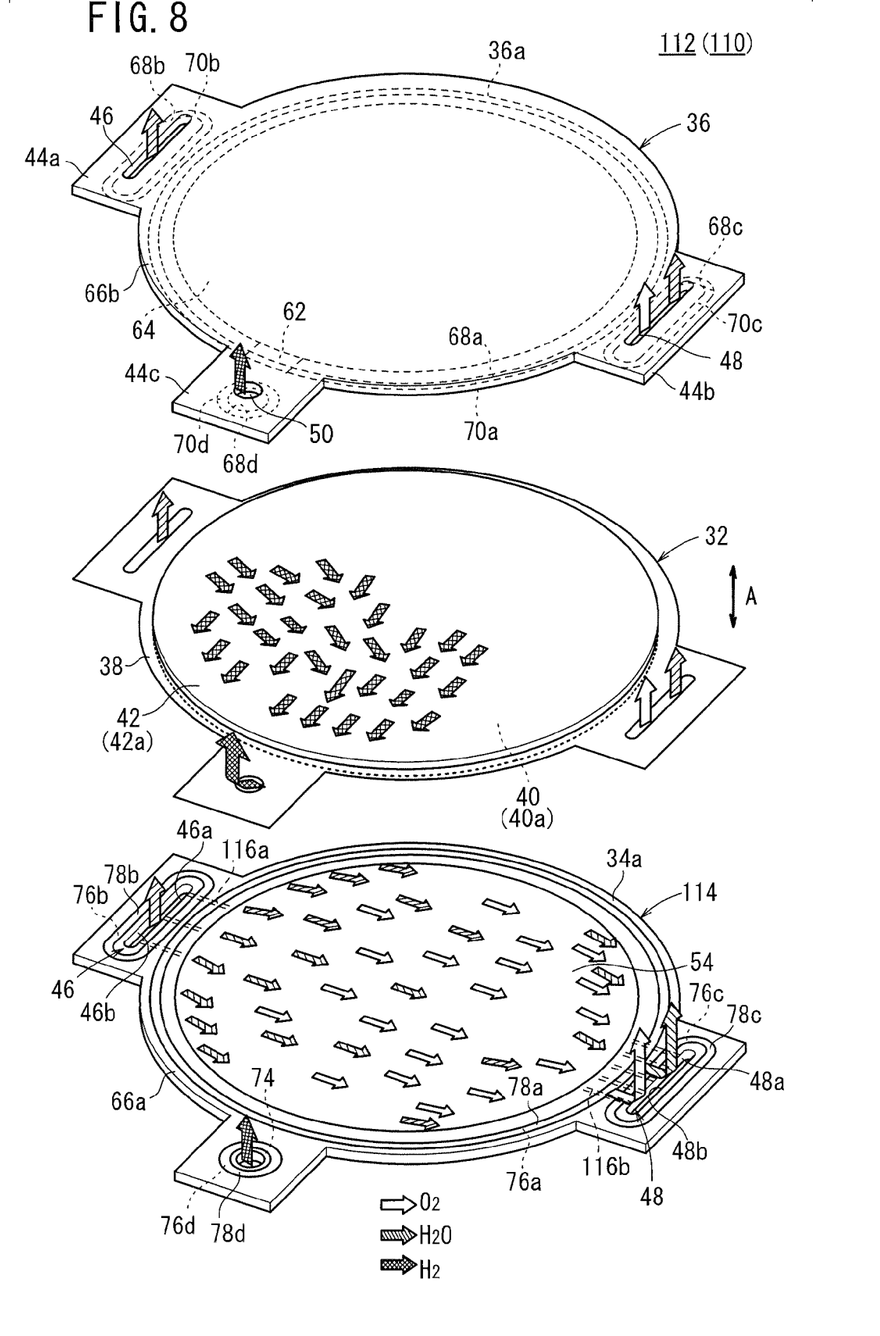
FIG. 8 is an exploded perspective view of a unit cell of a water electrolysis apparatus according to a fourth embodiment of the present invention.

FIG. 8 is an exploded perspective view of a water electrolysis apparatus 110 according to a fourth embodiment of the present invention. Those parts of the water electrolysis apparatus 110 which are identical to those of the water electrolysis apparatus 10 according to the first embodiment are denoted by identical reference characters and will not be described below.

A unit cell 112 includes a substantially disk-shaped membrane electrode assembly 32, and an anode separator 114 and a cathode separator 36 which sandwich the membrane electrode assembly 32 therebetween.

Figure 9:
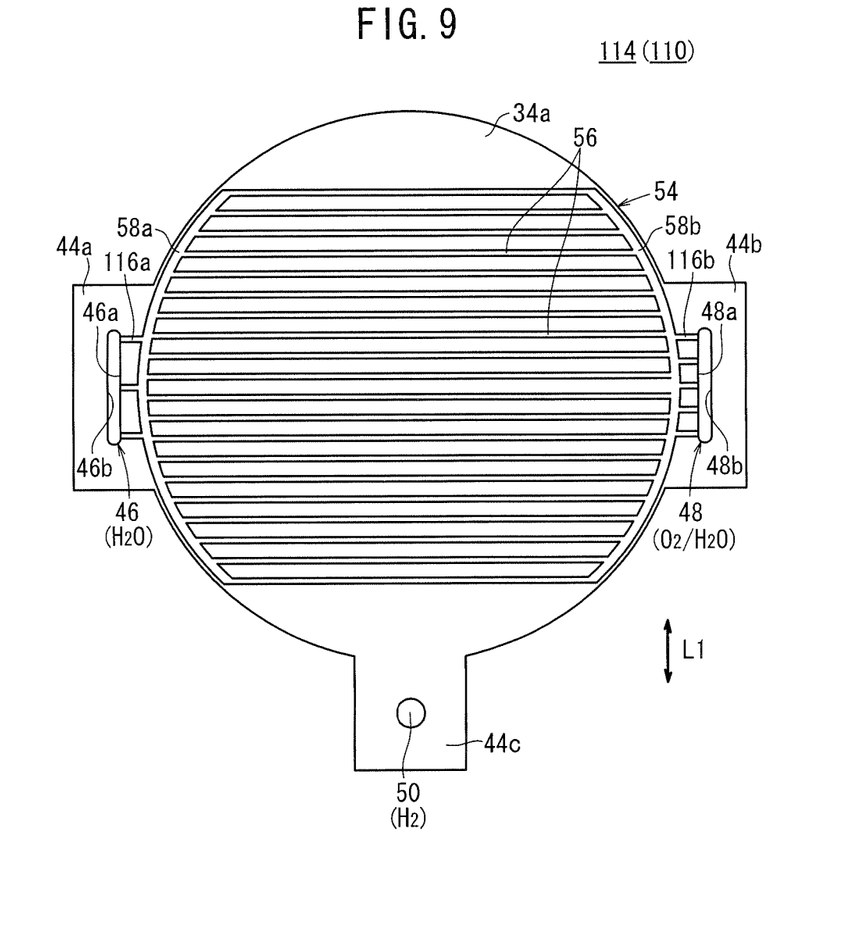
FIG. 9 is a plan view of an anode separator of the unit cell shown in FIG. 8.

As shown in FIGS. 8 and 9, the anode separator 114 has a plurality of (e.g., three) inlet joint channels 116a in fluid communication with the water supply passage 46, and a plurality of (e.g., five) outlet joint channels 116b in fluid communication with the discharge passage 48. The inlet joint channels 116a and the outlet joint channels 116b have an opening of a circular cross-sectional shape, and are arranged in parallel to each other (see FIG. 9). The numbers of the inlet joint channels 116a and the outlet joint channels 116b may be set at any values, as long as the number of the outlet joint channels 116b is greater than the number of the inlet joint channels 116a.

In this case, only water is supplied from the water supply passage 46 through the inlet joint channels 116a to the water flow field 54, whereas water and generated oxygen are discharged from the water flow field 54 through the outlet joint channels 116b to the discharge passage 48. Accordingly, in the outlet joint channels 116b, a two-phase flow of water and gas (oxygen) exists, and then the generated gas results in an abrupt increase in the volume.

According to the fourth embodiment, the number of the outlet joint channels 116b in fluid communication with the discharge passage 48 is greater than the number of the inlet joint channels 116a in fluid communication with the water supply passage 46. Thus, even if unreacted water and generated oxygen exist in the outlet joint channels 116b and the volume increases accordingly, increase in the pressure loss in the outlet joint channels 116b can be prevented.

Thus, with a simple arrangement, the pressure loss in the water flow field 54 can be reduced suitably, whereby water can flow therethrough efficiently and economically. Consequently, the entire water flow field 54 can be uniformly and reliably supplied with water for an efficient water electrolyzing process.

Figure 10:
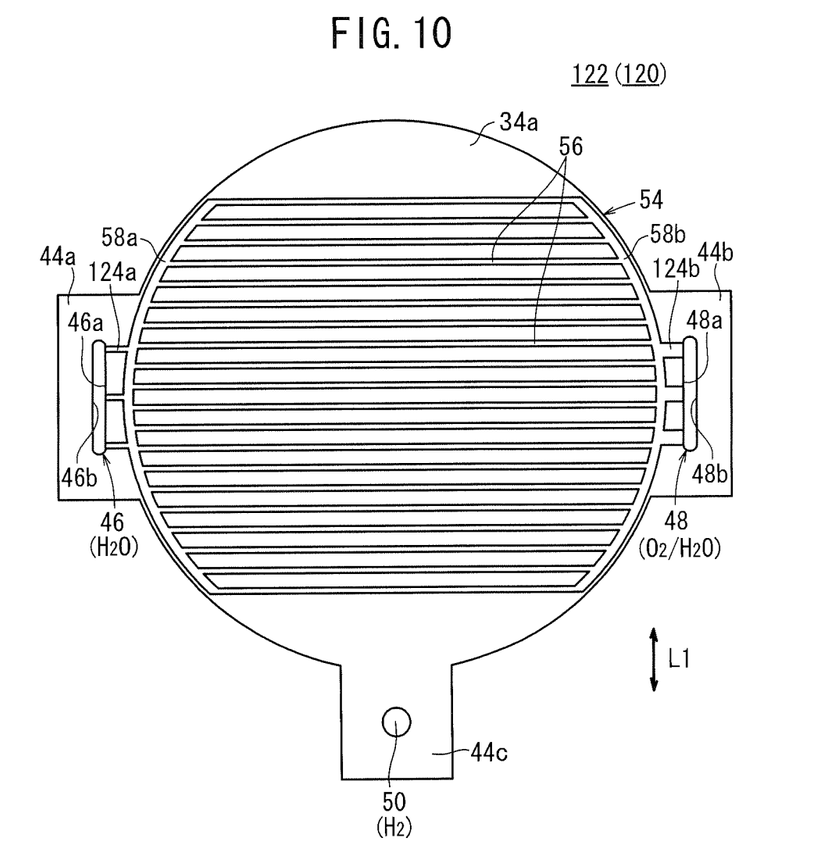
FIG. 10 is a plan view of an anode separator of a water electrolysis apparatus according to a fifth embodiment of the present invention.

FIG. 10 is a plan view of an anode separator 122 of a water electrolysis apparatus 120 according to a fifth embodiment of the present invention.

The anode separator 122 has a plurality of (e.g., three) inlet joint channels 124a in fluid communication with the water supply passage 46, and a plurality of (e.g., three) outlet joint channels 124b in fluid communication with the discharge passage 48. The inlet joint channels 124a and the outlet joint channels 124b each have an opening of a circular cross-sectional shape, and the opening diameter of the outlet joint channel 124b is greater than the opening diameter of the inlet joint channel 124a.

According to the fifth embodiment, the opening diameter of the outlet joint channel 124b is greater than the opening diameter of the inlet joint channel 124a. Accordingly, the pressure loss in the outlet joint channels 124b can be lowered suitably. Consequently, as in the fourth embodiment, the entire water flow field 54 can be uniformly and reliably supplied with water for an efficient water electrolyzing process.

Although certain preferred embodiments of the present invention have been shown and described in detail, it should be understood that various changes and modifications may be made therein without departing from the scope of the appended claims.

What is claimed is:

1. A water electrolysis apparatus formed by stacking a plurality of unit cells, the unit cells each comprising:
   an electrolyte membrane;
   a pair of current collectors disposed respectively on opposite sides of the electrolyte membrane;
   a pair of separators stacked respectively on the current collectors;
   wherein a water flow field for supplying water is defined between one of the current collectors and one of the separators and a hydrogen flow field for producing hydrogen through electrolysis of the water is defined between the other current collector and the other separator;
   a water supply passage extending along a stacked direction in which the unit cells are stacked, for supplying the water to the water flow field;
   a discharge passage extending along the stacked direction, for discharging a remaining amount of the water from the water flow field; and
   a plurality of inlet joint channels interconnecting the water supply passage and the water flow field, wherein the inlet joint channels each have an opening of a circular cross-sectional shape and are arranged in parallel to each other,
   wherein the unit cells are stacked vertically, and water is supplied vertically upward through the water supply passage,
   wherein the number of the inlet joint channels of the unit cell that is positioned vertically higher in the apparatus is greater than the number of the inlet joint channels of the unit cell that is positioned vertically lower in the apparatus, and
   wherein the water supply passage has an inner wall surface at which the inlet joint channels are open, and an outer wall surface which faces the inner wall surface, the inner wall surface and the outer wall surface jointly forming an opening of an oblong cross-sectional shape.

2. A water electrolysis apparatus according to claim 1,
wherein the unit cells each further comprise a plurality of outlet joint channels for interconnecting the discharge passage and the water flow field, and
wherein the discharge passage has an inner wall surface at which the outlet joint channels are open, and an outer wall surface which faces the inner wall surface, the inner wall surface and the outer wall surface jointly forming an opening of an oblong cross-sectional shape.

3. A water electrolysis apparatus according to claim 2, wherein the outlet joint channels each have an opening of a circular cross-sectional shape, and are arranged in parallel to each other.

4. A water electrolysis apparatus according to claim 2, wherein the unit cells are stacked vertically, and water is discharged vertically upward through the discharge passage, and
wherein the number of the outlet joint channels of the unit cell that is positioned vertically higher in the apparatus is greater than the number of the outlet joint channels of the unit cell that is positioned vertically lower in the apparatus.

5. A water electrolysis apparatus according to claim 2,
wherein the unit cells are stacked vertically, and water is discharged vertically upward through the discharge passage, and
wherein the cross sectional area of the outlet joint channels of the unit cell that is positioned vertically higher in the apparatus is greater than the cross sectional area of the outlet joint channels of the unit cell that is positioned vertically lower in the apparatus.

6. A water electrolysis apparatus according to claim 2,
wherein the water flow field includes:
a plurality of water channels extending along a plane of the current collector in parallel to an imaginary straight line which interconnects the water supply passage and the discharge passage, and the water channels being disposed parallel to each other in the plane of the current collector;
an arcuate inlet buffer extending around the current collector, and held in fluid communication with the water channels and the inlet joint channels; and
an arcuate outlet buffer extending around the current collector and held in fluid communication with the water channels and the outlet joint channels.

7. A water electrolysis apparatus formed by stacking a plurality of unit cells, the unit cells each comprising:
an electrolyte membrane;
a pair of current collectors disposed respectively on opposite sides of the electrolyte membrane;
a pair of separators stacked respectively on the current collectors;
wherein a water flow field for supplying water is defined between one of the current collectors and one of the separators and a hydrogen flow field for producing hydrogen through electrolysis of the water is defined between the other current collector and the other separator;
a water supply passage extending along a stacked direction in which the unit cells are stacked, for supplying the water to the water flow field;
a discharge passage extending along the stacked direction, for discharging a remaining amount of the water from the water flow field; and
a plurality of inlet joint channels interconnecting the water supply passage and the water flow field, wherein the inlet joint channels each have an opening of a circular cross-sectional shape and are arranged in parallel to each other,
wherein the unit cells are stacked vertically, and water is supplied vertically upward through the water supply passage, and
wherein the cross sectional area of the inlet joint channels of the unit cell that is positioned vertically higher in the apparatus is greater than the cross sectional area of the inlet joint channels of the unit cell that is positioned vertically lower in the apparatus
wherein the water supply passage has an inner wall surface at which the inlet joint channels are open, and an outer wall surface which faces the inner wall surface, the inner wall surface and the outer wall surface jointly forming an opening of an oblong cross-sectional shape.

8. A water electrolysis apparatus according to claim 7,
wherein the unit cells each further comprise a plurality of outlet joint channels for interconnecting the discharge passage and the water flow field, and
wherein the discharge passage has an inner wall surface at which the outlet joint channels are open, and an outer wall surface which faces the inner wall surface, the inner wall surface and the outer wall surface jointly forming an opening of an oblong cross-sectional shape.

9. A water electrolysis apparatus according to claim 8, wherein the outlet joint channels each have an opening of a circular cross-sectional shape, and are arranged in parallel to each other.

10. A water electrolysis apparatus according to claim 8, wherein the unit cells are stacked vertically, and water is discharged vertically upward through the discharge passage, and
wherein the number of the outlet joint channels of the unit cell that is positioned vertically higher in the apparatus is greater than the number of the outlet joint channels of the unit cell that is positioned vertically lower in the apparatus.

11. A water electrolysis apparatus according to claim 8,
wherein the unit cells are stacked vertically, and water is discharged vertically upward through the discharge passage, and
wherein the cross sectional area of the outlet joint channels of the unit cell that is positioned vertically higher in the apparatus is greater than the cross sectional area of the outlet joint channels of the unit cell that is positioned vertically lower in the apparatus.

12. A water electrolysis apparatus according to claim 8,
wherein the water flow field includes:
a plurality of water channels extending along a plane of the current collector in parallel to an imaginary straight line which interconnects the water supply passage and the discharge passage, and the water channels being disposed parallel to each other in the plane of the current collector;
an arcuate inlet buffer extending around the current collector, and held in fluid communication with the water channels and the inlet joint channels; and
an arcuate outlet buffer extending around the current collector and held in fluid communication with the water channels and the outlet joint channels.

* * * * *